United States Patent
Hansen et al.

(10) Patent No.: US 9,516,483 B2
(45) Date of Patent: Dec. 6, 2016

(54) WIRELESS COMMUNICATION BETWEEN STATIONS OF DIFFERING PROTOCOLS

(75) Inventors: Christopher J. Hansen, Sunnyvale, CA (US); Jason A. Trachewsky, Menlo Park, CA (US); Timothy W. Markison, Austin, TX (US)

(73) Assignee: BROADCOM CORPORATION, Irvine, CA (US)

( * ) Notice: Subject to any disclaimer, the term of this patent is extended or adjusted under 35 U.S.C. 154(b) by 2480 days.

(21) Appl. No.: 10/857,540

(22) Filed: May 28, 2004

(65) Prior Publication Data

US 2005/0185671 A1    Aug. 25, 2005

Related U.S. Application Data

(60) Provisional application No. 60/546,622, filed on Feb. 20, 2004.

(51) Int. Cl.
| | |
|---|---|
| H04W 4/18 | (2009.01) |
| H04L 29/06 | (2006.01) |
| H04W 80/00 | (2009.01) |
| H04W 88/08 | (2009.01) |
| H04W 88/16 | (2009.01) |

(52) U.S. Cl.
CPC ............. *H04W 4/18* (2013.01); *H04L 69/08* (2013.01); *H04W 80/00* (2013.01); *H04W 88/08* (2013.01); *H04W 88/16* (2013.01)

(58) Field of Classification Search
CPC .................................................. H04W 4/18
USPC ....... 370/326, 329, 338, 465–467, 252, 388, 370/402, 474, 401, 389; 455/550.1; 709/221
See application file for complete search history.

(56) References Cited

U.S. PATENT DOCUMENTS

| | | | | |
|---|---|---|---|---|
| 5,208,811 | A * | 5/1993 | Kashio et al. | 370/401 |
| 5,930,241 | A * | 7/1999 | Fried | 370/328 |
| 6,311,072 | B1 | 10/2001 | Barclay et al. | |
| 6,674,767 | B1 * | 1/2004 | Kadyk et al. | 370/466 |
| 6,842,607 | B2 * | 1/2005 | Godfrey et al. | 455/41.2 |

(Continued)

FOREIGN PATENT DOCUMENTS

| | | |
|---|---|---|
| WO | WO 01/84789 A2 | 11/2001 |
| WO | WO 03/090013 A2 | 10/2003 |

*Primary Examiner* — Andrew Lai
*Assistant Examiner* — Andrew C Lee
(74) *Attorney, Agent, or Firm* — Garlick & Markison; Bruce E. Garlick

(57) ABSTRACT

A method for wireless communication between stations of differing protocols begins by determining whether protocols of target stations of a wireless communication are different than a protocol of a source station. The method continues by, when at least one of the target stations has a different protocol than the protocol of the source station, determining whether the wireless communication is a direct wireless communication or an indirect wireless communication. The method continues with the source station transmitting a frame to an access point, wherein the frame is formatted in accordance with the protocol of the source station, when the wireless communication is the indirect wireless communication. The method continues with the access point converting the frame into at least one alternate frame based on the protocol of the at least one of the target stations having the different protocol. The method continues with the access point transmitting the at least one alternate frame to the at least one of the target stations.

20 Claims, 15 Drawing Sheets

(56) References Cited

U.S. PATENT DOCUMENTS

| | | | |
|---|---|---|---|
| 6,873,611 B2* | 3/2005 | Rios | 370/338 |
| 6,879,600 B1* | 4/2005 | Jones et al. | 370/466 |
| 6,912,230 B1* | 6/2005 | Salkini et al. | 370/466 |
| 6,940,844 B2* | 9/2005 | Purkayastha et al. | 370/338 |
| 6,961,583 B2* | 11/2005 | Moles et al. | 455/552.1 |
| 7,016,948 B1* | 3/2006 | Yildiz | 709/221 |
| 7,508,799 B2* | 3/2009 | Sumner et al. | 370/338 |
| 8,233,450 B2* | 7/2012 | Zaki et al. | 370/331 |
| 2003/0053486 A1* | 3/2003 | Okamori | 370/474 |
| 2003/0063607 A1* | 4/2003 | Adachi et al. | 370/389 |
| 2003/0129969 A1 | 7/2003 | Rucinski | |
| 2004/0090924 A1* | 5/2004 | Giaimo et al. | 370/252 |
| 2004/0125820 A1* | 7/2004 | Rios | 370/480 |
| 2004/0219945 A1* | 11/2004 | Coffey | 455/550.1 |
| 2004/0246932 A1* | 12/2004 | Fischer | 370/338 |
| 2005/0083893 A1* | 4/2005 | Purkayastha et al. | 370/338 |
| 2007/0125775 A1* | 6/2007 | Isogai et al. | 219/730 |
| 2007/0230453 A1* | 10/2007 | Giaretta et al. | 370/389 |
| 2009/0268754 A1* | 10/2009 | Palm et al. | 370/466 |

\* cited by examiner

.11n frame format for communication only between 802.11n devices

.11n frame format when communication includes
802.11n & 802.11a &/or 802.11g devices .11n frame format when communication includes 802.11n & 802.11a, .11b &/or .11g devices

US 9,516,483 B2

WIRELESS COMMUNICATION BETWEEN STATIONS OF DIFFERING PROTOCOLS

This invention is claiming priority under 35 USC §119(e) to a provisionally filed patent application having the same title as the present patent application, a filing date of Feb. 20, 2004, and a Ser. No. 60/546,622.

BACKGROUND OF THE INVENTION

1. Technical Field of the Invention

This invention relates generally to wireless communication systems and more particularly to supporting multiple wireless communication protocols within a wireless local area network.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is further known, the standard to which a wireless communication device is compliant within a wireless communication system may vary. For instance, as the IEEE 802.11 specification has evolved from IEEE 802.11 to IEEE 802.11b to IEEE 802.11a and to IEEE 802.11g, wireless communication devices that are compliant with IEEE 802.11b may exist in the same wireless local area network (WLAN) as IEEE 802.11g compliant wireless communication devices. As another example, IEEE 802.11a compliant wireless communication devices may reside in the same WLAN as IEEE 802.11g compliant wireless communication devices. When legacy devices (i.e., those compliant with an earlier version of a standard) reside in the same WLAN as devices compliant with later versions of the standard, a mechanism is employed to insure that legacy devices know when the newer version devices are utilizing the wireless channel as to avoid a collision.

For instance, backward compatibility with legacy devices has been enabled exclusively at either the physical (PHY) layer (in the case of IEEE 802.11b) or the Media-Specific Access Control (MAC) layer (in the case of 802.11g). At the PHY layer, backward compatibility is achieved by re-using the PHY preamble from a previous standard. In this instance, legacy devices will decode the preamble portion of all signals, which provides sufficient information for determining that the wireless channel is in use for a specific period of time, thereby avoid collisions even though the legacy devices cannot fully demodulate and/or decode the transmitted frame(s).

At the MAC layer, backward compatibility with legacy devices is enabled by forcing devices that are compliant with a newer version of the standard to transmit special frames using modes or data rates that are employed by legacy devices. For example, the newer devices may transmit Clear to Send/Ready to Send (CTS/RTS) exchange frames and/or CTS to self frames as are employed in IEEE 802.11g. These special frames contain information that sets the NAV (network allocation vector) of legacy devices such that these devices know when the wireless channel is in use by newer stations.

As future standards are developed (e.g., IEEE 802.11n and others), it may be desirable to do more than just avoid collisions between newer version devices and legacy devices. For instance, it may be desirable to allow newer version devices to communication with older version devices.

Therefore, a need exists for a method and apparatus that enables communication between devices of multiple protocols within a wireless communication system, including wireless local area networks.

BRIEF SUMMARY OF THE INVENTION

The wireless communications between stations of differing protocols of the present invention substantially meets these needs and others. In one embodiment, a method for wireless communication between stations of differing protocols begins by determining whether protocols of target stations of a wireless communication are different than a protocol of a source station. The method continues by, when at least one of the target stations has a different protocol than the protocol of the source station, determining whether the wireless communication is a direct wireless communication or an indirect wireless communication. The method continues with the source station transmitting a frame to an access point, wherein the frame is formatted in accordance with the protocol of the source station, when the wireless communication is the indirect wireless communication. The method continues with the access point converting the frame into at least one alternate frame based on the protocol of the at least one of the target stations having the different protocol. The method continues with the access point transmitting the at least one alternate frame to the at least one of the target stations.

DETAILED DESCRIPTION OF THE INVENTION

Figure 1:
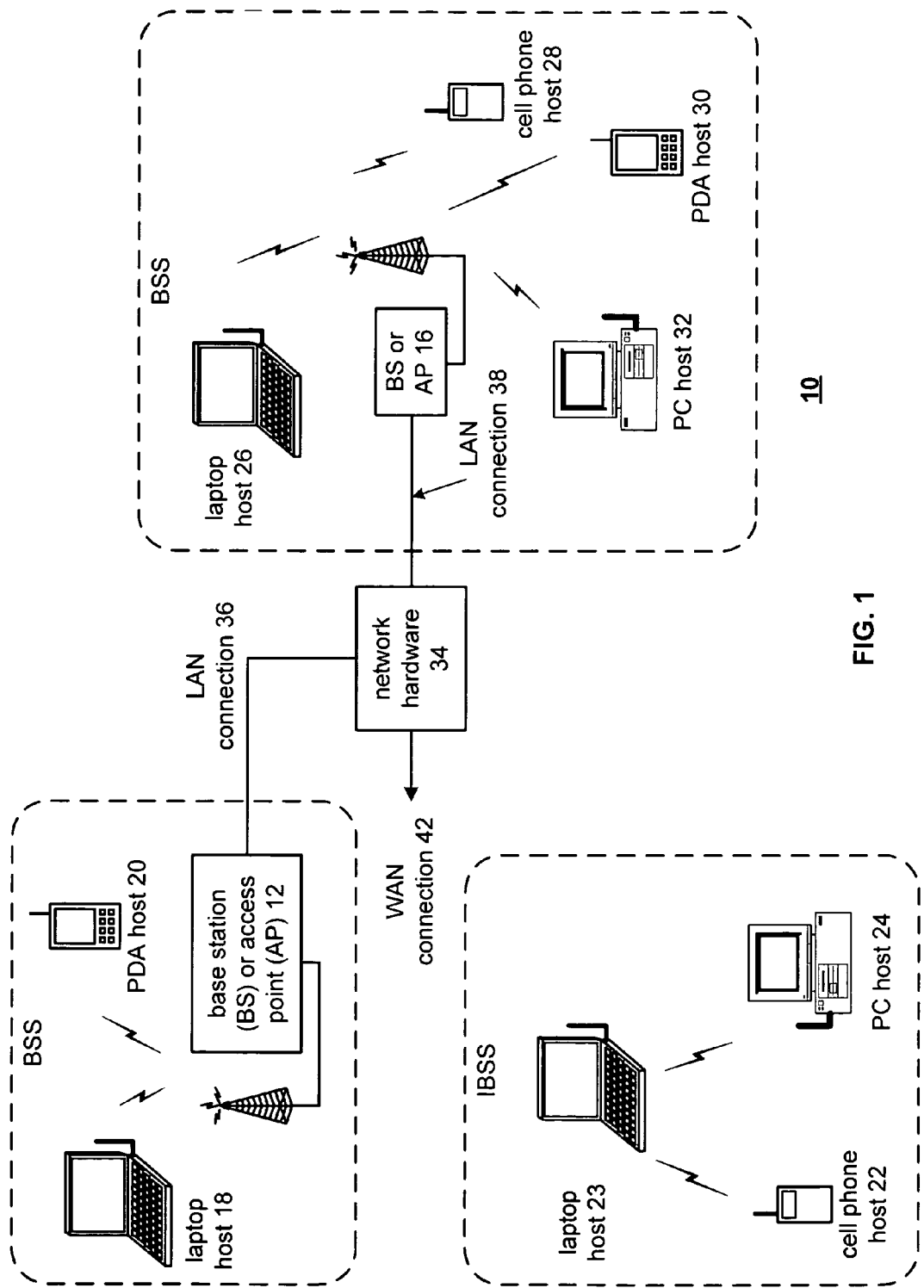
FIG. 1 is a schematic block diagram of a wireless communication system in accordance with the present invention.

FIG. 1 is a schematic block diagram illustrating a communication system 10 that includes a plurality of base stations and/or access points 12 and 16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of at least some of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12 and 16 has an associated antenna or antenna array to communicate with the wireless communication devices in its regional area, which is generally referred to as a basic service set (BSS). Typically, the wireless communication devices register with a particular base station or access point 12 or 16 to receive services from the communication system 10.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Wireless communication devices 22, 23, and 24 are located in an area of the wireless communication system 10 where they are not affiliated with an access point. In this region, which is generally referred to as an independent basic service set (IBSS), the wireless communication devices communicate directly (i.e., point-to-point or point-to-multiple point), via an allocated channel to produce an ad-hoc network.

Figure 2:
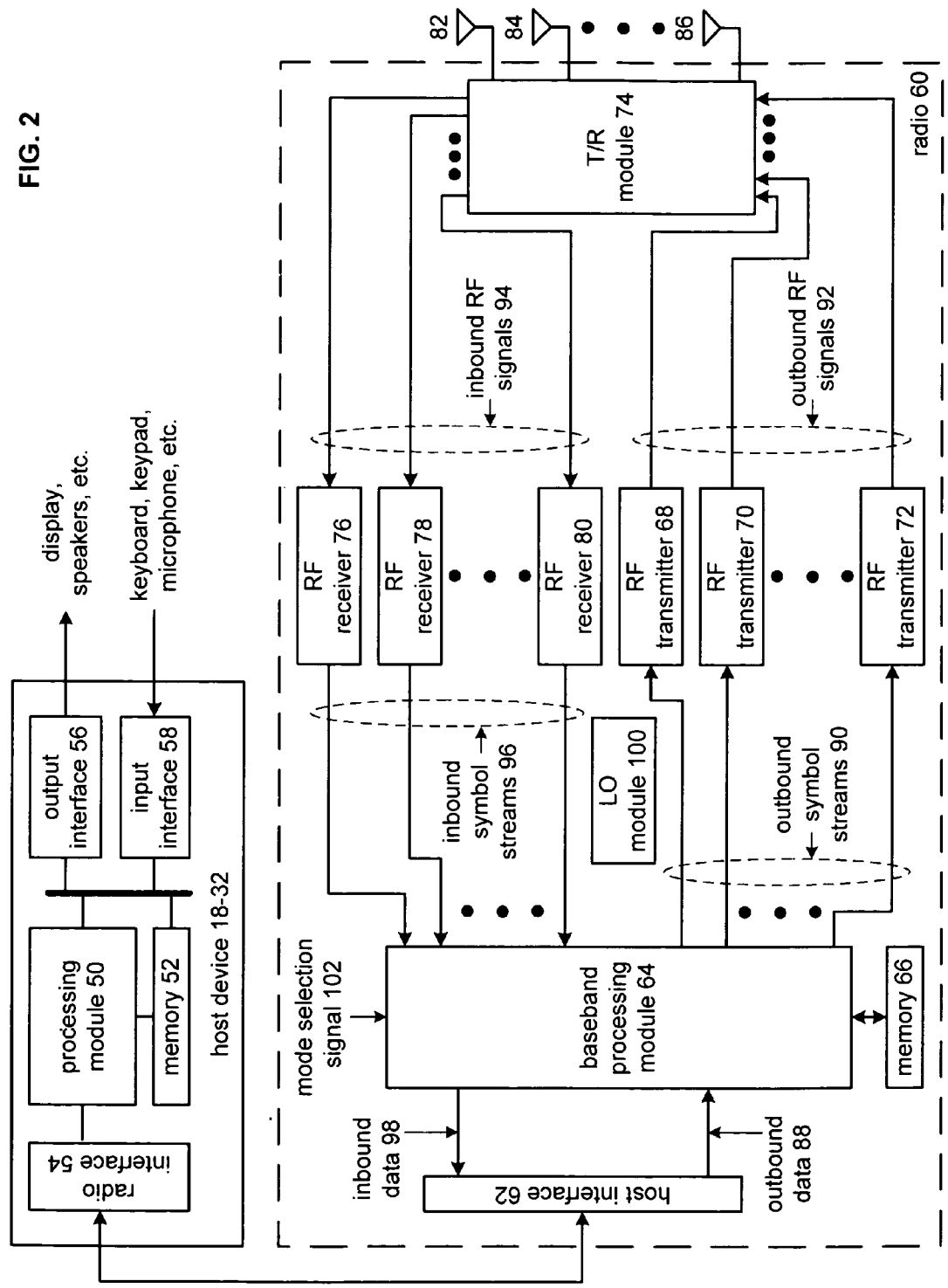
FIG. 2 is a schematic block diagram of a wireless communication device in accordance with the present invention.

FIG. 2 is a schematic block diagram illustrating a wireless communication device that includes the host device 18-32 and an associated radio, or station, 60. For cellular telephone hosts, the radio 60 is a built-in component. For personal digital assistants hosts, laptop hosts, and/or personal computer hosts, the radio 60 may be built-in or an externally coupled component. In this embodiment, the station may be compliant with one of a plurality of wireless local area network (WLAN) protocols including, but not limited to, IEEE 802.11n.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio, or station, 60 includes a host interface 62, a baseband processing module 64, memory 66, a plurality of radio frequency (RF) transmitters 68-72, a transmit/receive (T/R) module 74, a plurality of antennas 82-86, a plurality of RF receivers 76-80, and a local oscillation module 100. The baseband processing module 64, in combination with operational instructions stored in memory 66, execute digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM.

The baseband processing module 64, based on the mode selection signal 102 produces the one or more outbound symbol streams 90 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennas, the baseband processing module 64 will produce 2, 3 or 4 outbound symbol streams 90 corresponding to the number of antennas from the output data 88.

Depending on the number of outbound streams 90 produced by the baseband module 64, a corresponding number of the RF transmitters 68-72 will be enabled to convert the outbound symbol streams 90 into outbound RF signals 92. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennas 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received. The baseband processing module 60 receives the inbound symbol streams 90 and converts them into inbound data 98, which is provided to the host device 18-32 via the host interface 62. For a further discussion of an implementation of the radio, or station, 60 refer to patent application entitled "WLAN TRANSMITTER HAVING HIGH DATA THROUGHPUT," Ser. No. 60/545,854, and a provisional filing date of Feb. 19, 2004 and patent application entitled "WLAN RECEIVER HAVING AN ITERATIVE DECODER," Ser. No. 60/546,051, and a provisional filing date of Feb. 19, 2004.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennas 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
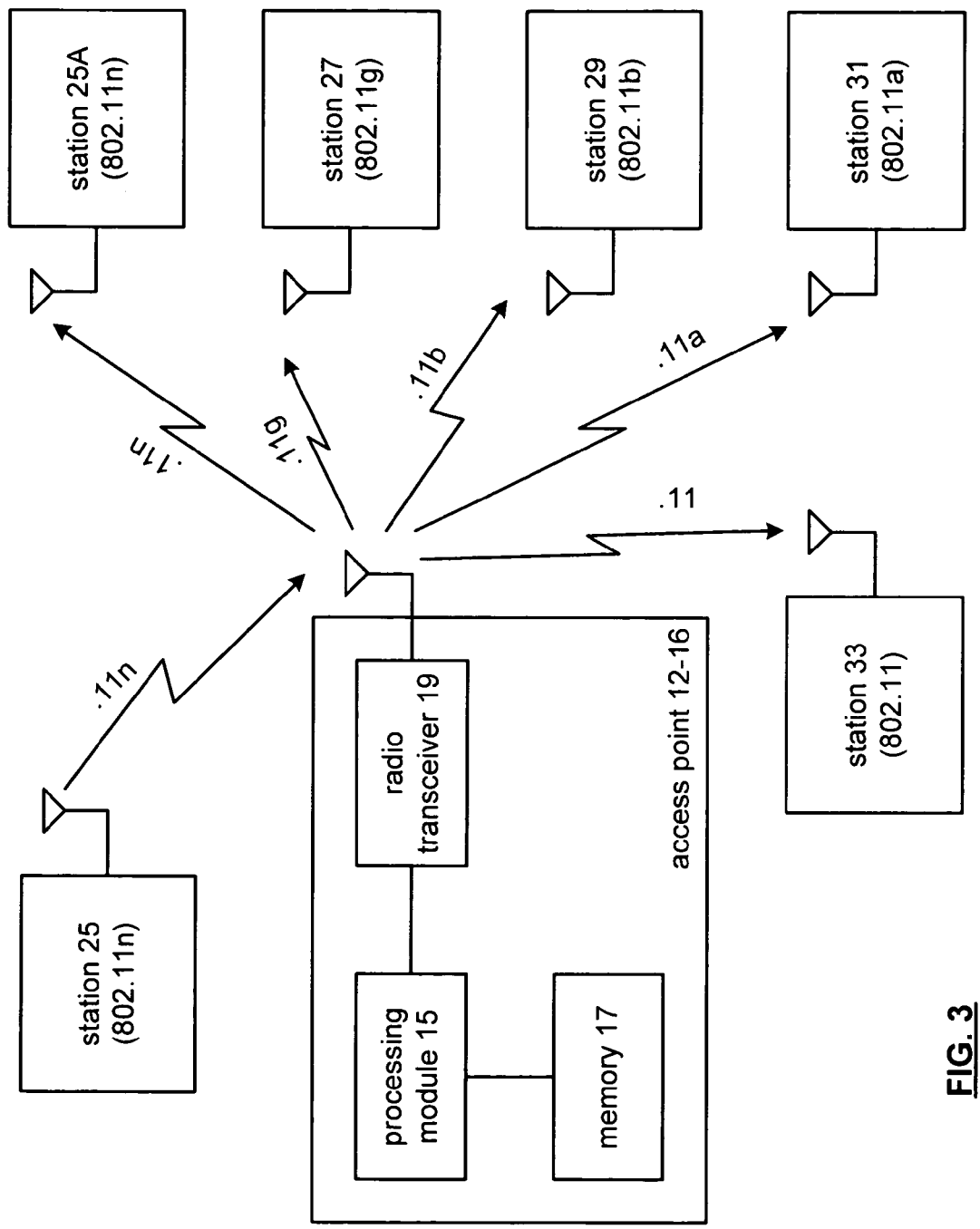
FIG. 3 is a schematic block diagram of an access point communicating with wireless communication devices in accordance with the present invention.

FIG. 3 is a schematic block diagram of an indirect wireless communication within a basic service set (BSS). In this illustration, a station 25, which may be compliant with IEEE 802.11(n) transmits a packet formatted in accordance with the IEEE 802.11(n) protocol. The access points 12 or 16, which includes a processing module 15, memory 17, and a radio transceiver 19 receives the IEEE 802.11(n) frame and relays it to a plurality of target stations 25A, 27, 29, 31 and 33. The processing module 15 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 17 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 15 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory 17 stores, and the processing module 15 executes, operational instructions corresponding to at least some of the steps and/or functions illustrated in FIGS. 3-15.

The access point 12 and/or 16 may relay the IEE 802.11 (n) frame to station 25A and/or may reformat the frame in accordance with one of the other protocols. As illustrated, station 27 is compliant with IEEE 802.11(g), station 29 is compliant with IEEE 802.11(b), station 31 is compliant with IEEE 802.11(a) and station 33 is compliant with IEEE 802.11. To communicate the frame from station 25 to the other stations, the access point 12 and/or 16 reformats the frame in accordance with a protocol that can be processed by the given station. For example, to relay the frame to station 27, which is compliant with IEEE 802.11(g), the access point reformats the 802.11n frame into one or more 802.11g frames that are transmitted to station 27. Similarly, the access point reformats the 802.11n frame into one or more 802.11b frames, which are then transmitted to station 29. The access point may also reformat the 802.11n frame into one or more 802.11a frames and 802.11 frames for stations 31 and 33, respectively.

The access point 12 and/or 16 has a variety of ways in which it can relay the 802.11n frame and/or reformatted frames to the target stations 25A-33. Such various methods are illustrated in FIGS. 4 and 5.

Figure 4:
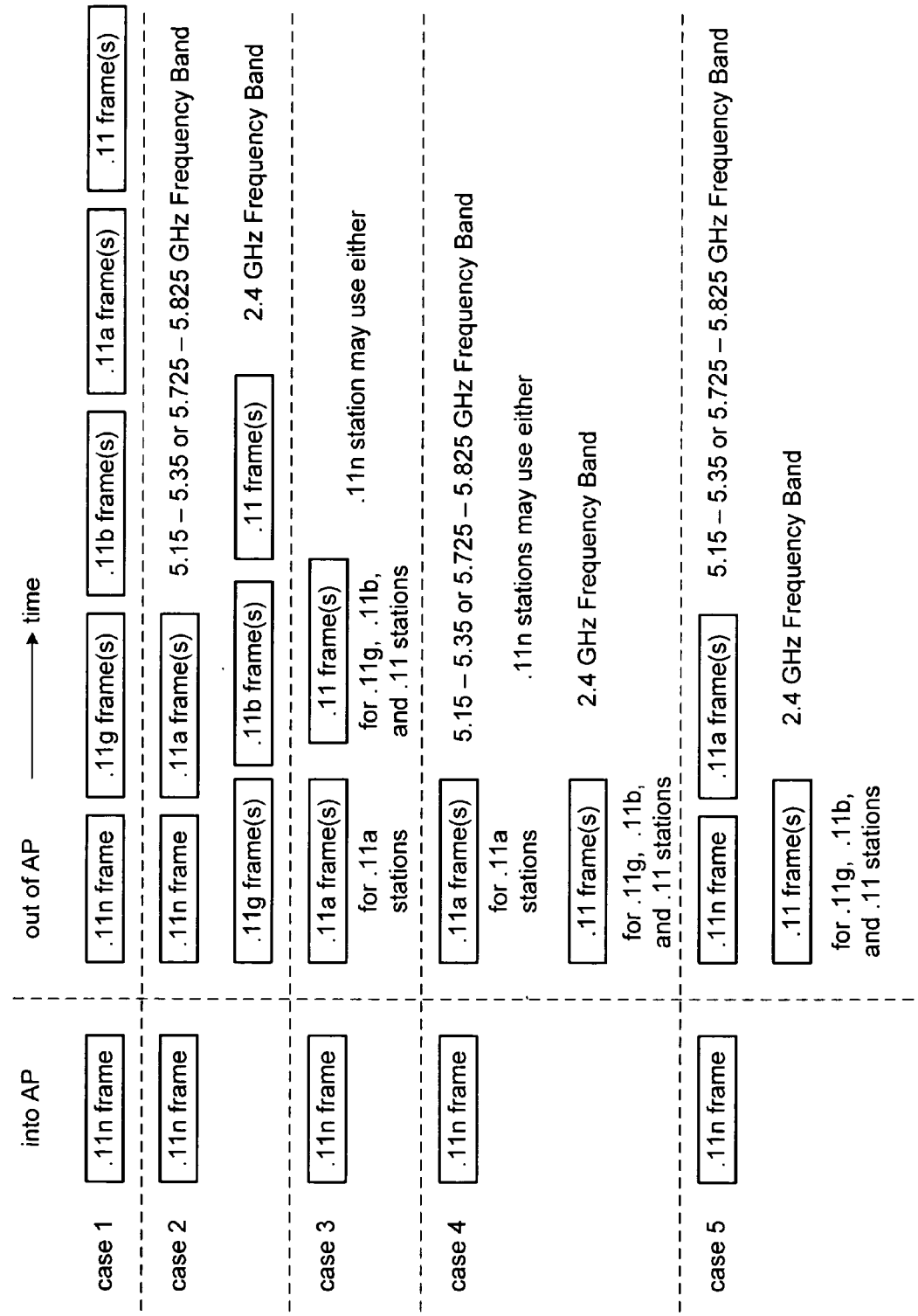
FIGS. 4 and 5 are a diagram of numerous examples of the communication of FIG. 3 in which at least one frame from a source station is communicated to a plurality of target stations having differing protocols in accordance with the present invention.
Figure 5:
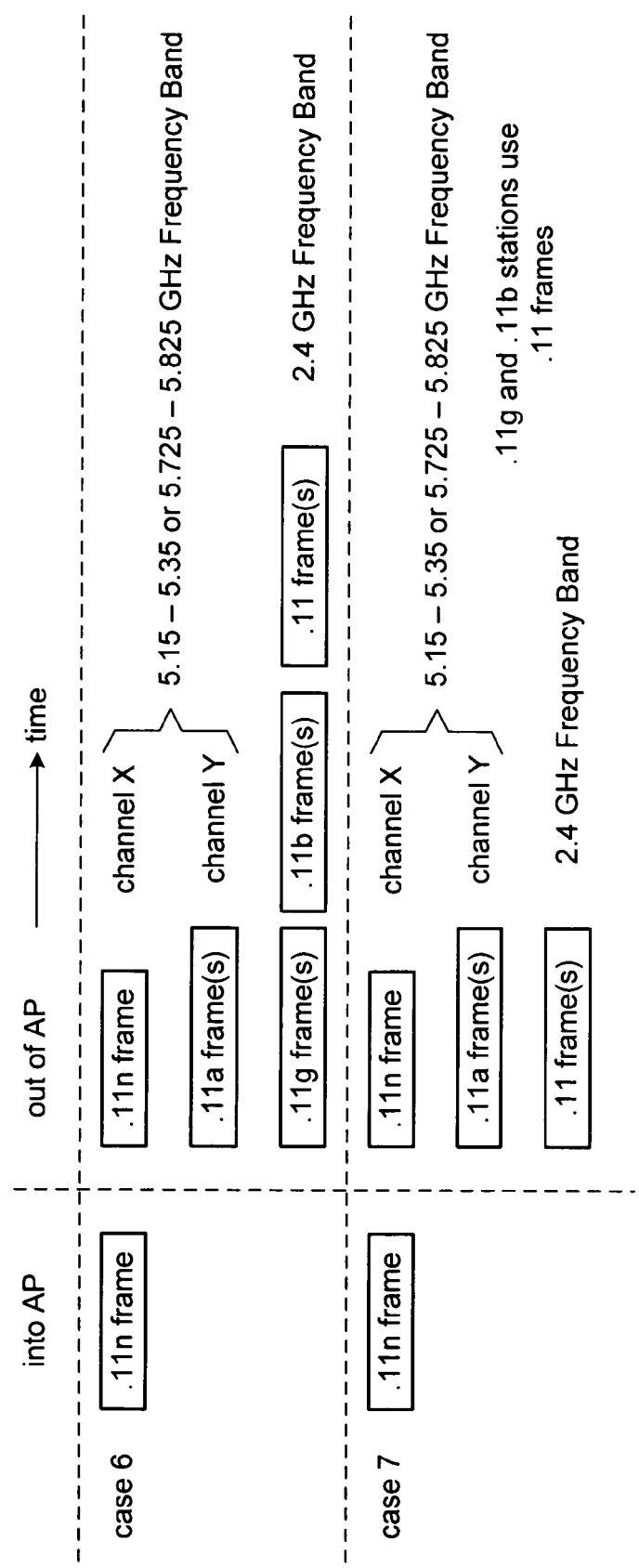

FIG. 4 illustrates five scenarios in which the access point may relay the frame to the plurality of target stations of FIG. 3. In case 1, the access point receives a frame that is formatted in accordance with IEEE 802.11(n). The 802.11(n) frame may be formatted in accordance with the formats illustrated in FIGS. 12, 13 and/or 14. The access point may sequentially transmit the frame or an alternate frame to the corresponding target stations. For instance, in sequential time, the access point may transmit the 802.11(n) frame to station 25A, wherein the 802.11(n) frame includes legacy collision prevention information as will be further described with reference to FIGS. 13 and 14. The access point then converts the 802.11(n) frame into one or more 802.11(g) compliant frames. Such frame or frames will include a legacy collision protection information as is defined in the 802.11(g) standard. The 802.11(g) frame or frames will then be transmitted to station 27.

Next in time, the access point converts the 802.11(n) frame into one or more 802.11(b) compliant frames which are then transmitted to station 29. The access point then converts the 802.11(n) frame into one or more 802.11(a) compliant frames which are transmitted to station 31. The access point then converts the 802.11 frame into 802.11 compliant frame or frames which are transmitted to station 33. Note that the sequential order of the transmission of frames may be altered from that given in FIG. 4 such that any one of the protocol formatted frames may be transmitted $1^{st}$, $2^{nd}$ or $3^{rd}$ et cetera. Note that if the example of FIG. 3 includes less diverse protocol stations (e.g., does not include station 33), corresponding frames for station 33 would not be generated.

Alternatively, the access point may utilize the scenario of case 2 in which it transmits frames in a given frequency band concurrently with frames in a different frequency band. In this illustration, the 802.11(n) frame and 802.11(a) frame or frames, which reside in the 5.15 to 5.35 or 5.725 to 5.825 GHz frequency band may be transmitted concurrently with the transmission of 802.11(g) frames, 802.11(b) frames and/or 802.11 frames, which reside in the 2.4 GHz band.

As yet another alternative, the access point may utilize the scenario of case 3 in which it transmits the most legacy frame format for the devices. The most legacy device is the oldest device in a given frequency band. For example, in the 5 GHz frequency band the 802.11(a) is legacy to 802.11(n). In the 2.4 GHz band, the 802.11 is a legacy to 802.11(b), which is a legacy to 802.11(g) which is a legacy to 802.11(n). In this instance, the most legacy formatted frames may be transmitted sequentially in time. Note that the 802.11(n) station may use either frame format.

As a further alternative, the access point may use the scenario of case 4 where it transmits the legacy frames concurrently in different frequency bands. As yet another alternative, the access point may utilize the scenario of case 5 where in one frequency band (e.g., the 2.4 frequency band), it transmits the most legacy frames concurrently with sequential frames of 802.11(n) and 802.11(a) frames in the 5 GHz frequency band. In this scenario, the 802.11(g), 802.11(b) and 802.11 stations utilize the 802.11 frames.

The access point may further utilize the scenario of case 6, which is illustrated in FIG. 5, where different channels within a frequency band may be used to concurrently transmit different formatted frames. In this example, the 802.11(n) frame may be transmitted on channel X within the 5 GHz frequency band while the 802.11(a) frames may be transmitted on channel Y in the same frequency band. In the 2.4 GHz frequency band, the 802.11(g) frames may be sequentially transmitted with the 802.11(b) frames and/or the 802.11 frames.

As yet another alternative, the access point may utilize the scenario of case 7 where the different channels are used for the 802.11(n) frames and 802.11(a) frames and the 2.4 GHz band utilizes the most legacy frame format for the 802.11(g), 802.11(b) and 802.11 stations such that the frames are transmitted concurrently.

Figure 6:
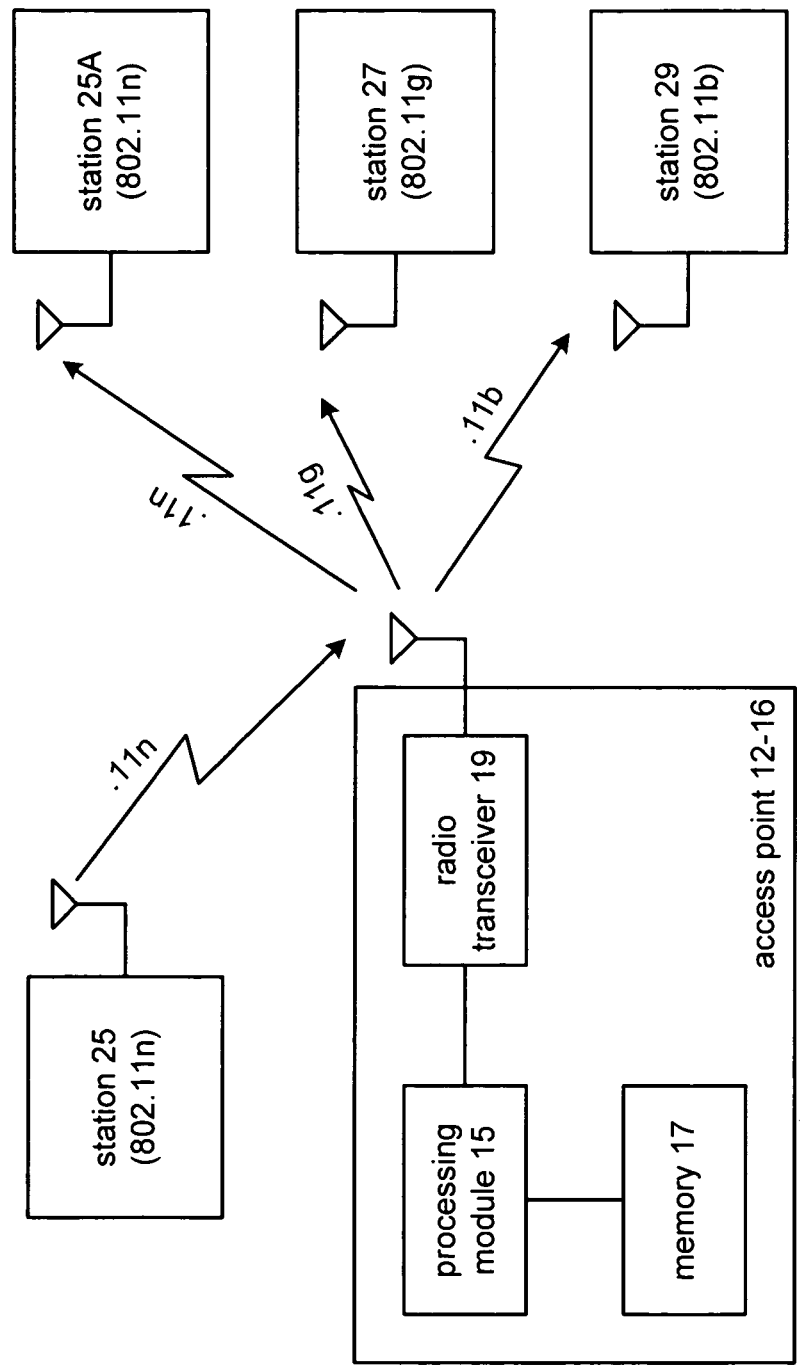
FIG. 6 is a schematic block diagram of an access point participating in another communication with wireless communication devices in accordance with the present invention.

FIG. 6 is a schematic block diagram of an access point providing indirect communications between station 25 and stations 25A, 27 and 29. In this scenario, the stations only include 802.11(n) compliant devices 802.11(g) compliant devices and 802.11(b) compliant devices. To provide the communication with the stations 25A, 27 and 29, the access point may utilize any of the scenarios illustrated in FIG. 7.

Figure 7:
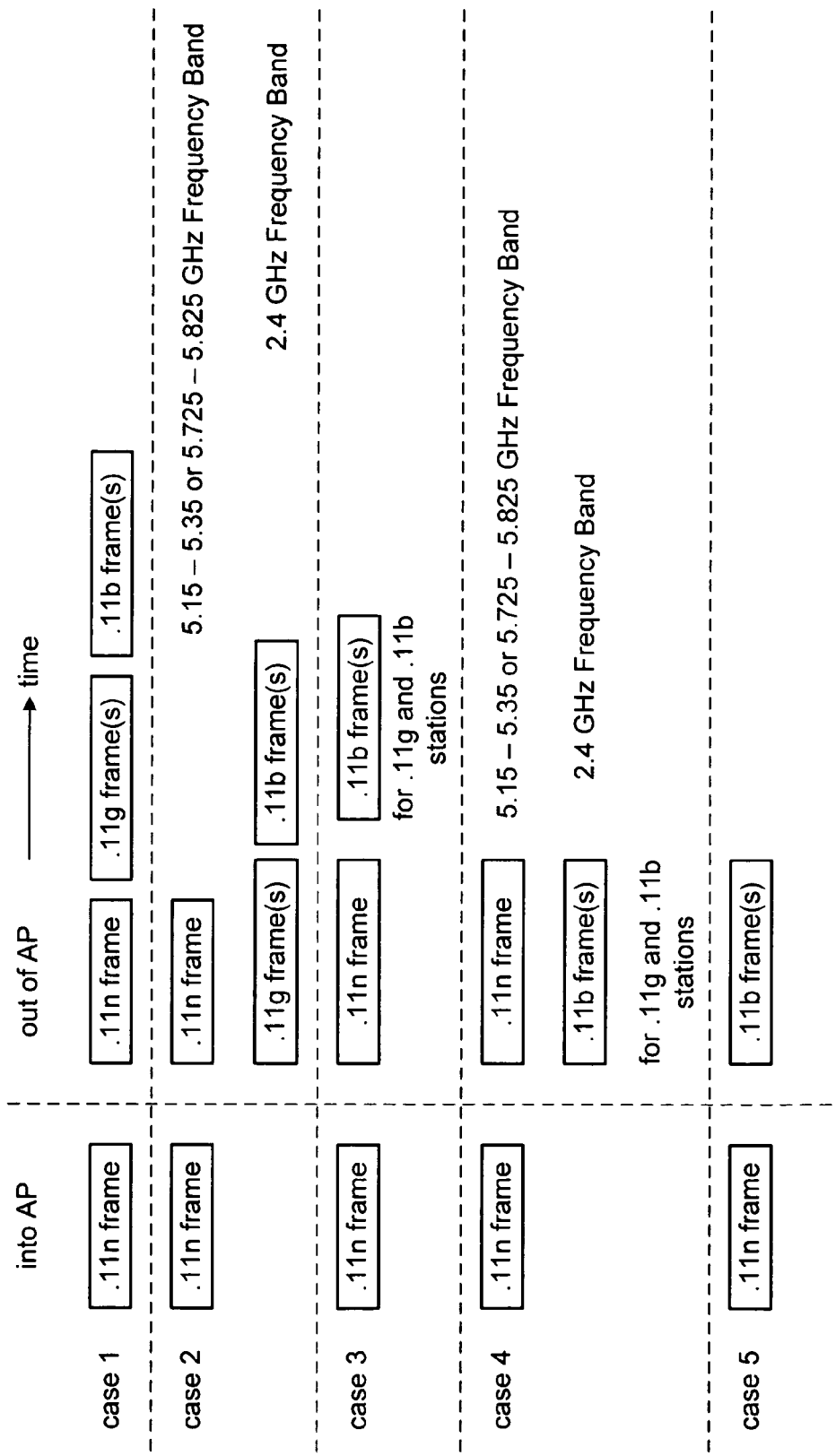
FIG. 7 is a diagram of numerous examples of the communication of FIG. 6 in which at least one frame from a source station is communicated to a plurality of target stations having differing protocols in accordance with the present invention.

As shown in FIG. 7, five cases may be used in which the access point may provide the 802.11(n) frame it receives from station 25 and relay it to stations 25A, 27 and 29. As shown, the relaying of the frame may be done sequentially, in parallel, utilizing legacy base frames, et cetera, similar to the scenarios of FIGS. 4 and 5.

Figure 8:
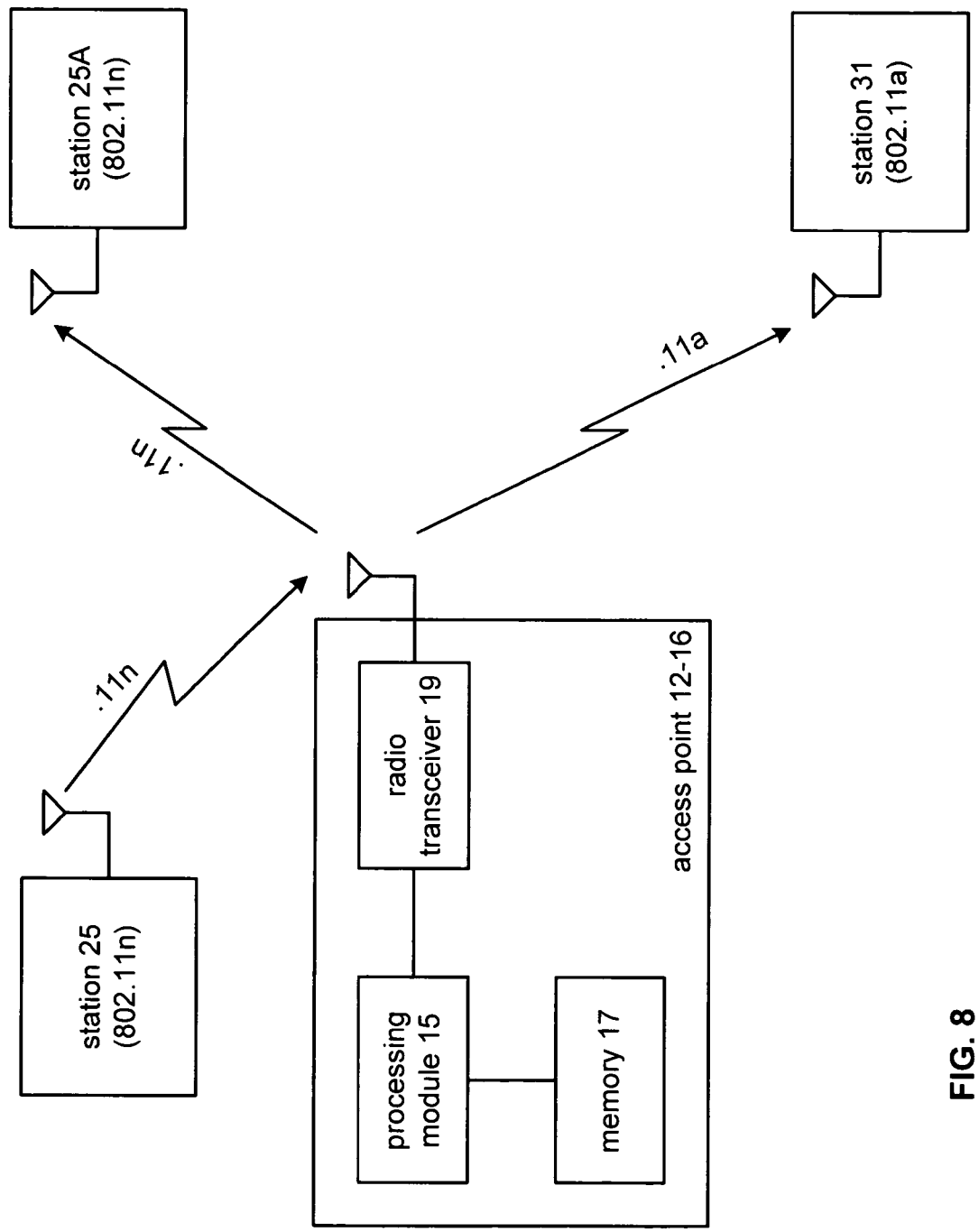
FIG. 8 is a schematic block diagram of an access point participating in another communication with wireless communication devices in accordance with the present invention.

FIG. 8 is a schematic block diagram of an indirect communication from station 25 via access point 12 or 16 to stations 25A and 31. In this scenario, the protocols only include 802.11(n) and 802.11(a). In such an instance, the access point may utilize any of the scenarios illustrated in FIG. 9.

Figure 9:
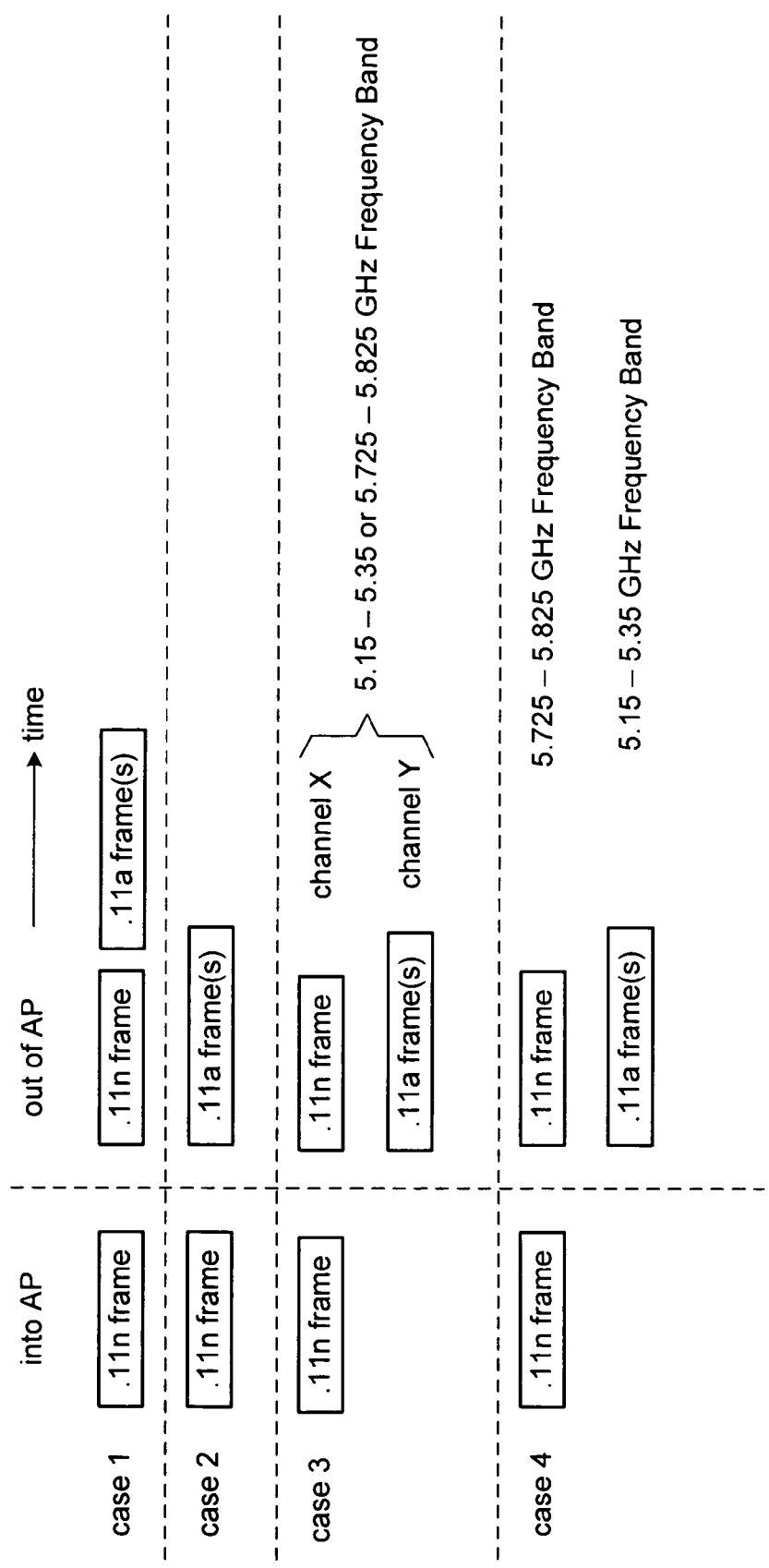
FIG. 9 is a diagram of numerous examples of the communication of FIG. 8 in which at least one frame from a source station is communicated to a plurality of target stations having differing protocols in accordance with the present invention.

As shown in FIG. 9, one of four scenarios may be utilized to relay the 802.11(n) frame the access point receives to the other target stations. As shown, the relaying of the frames may be done sequentially in parallel and/or using a legacy frame format, similarly to the scenarios of FIGS. 4 and 5.

Figure 10:
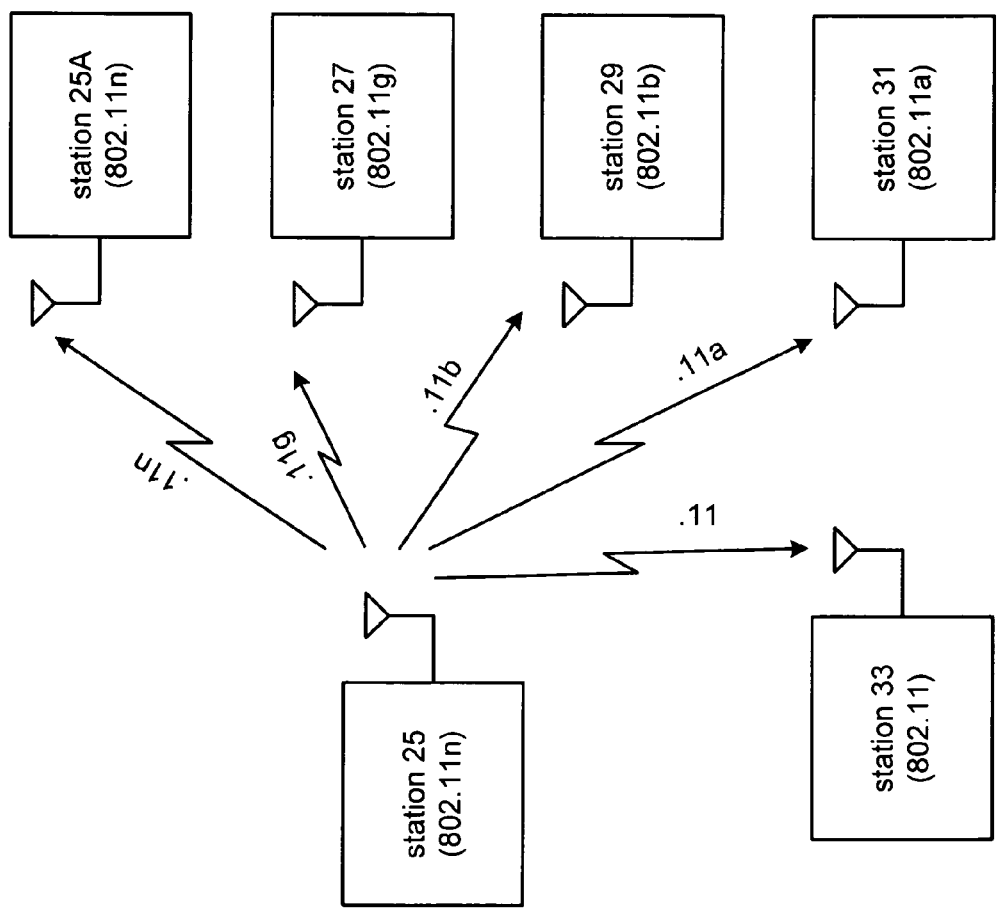
FIG. 10 is a schematic block diagram of a source station communicating directly with a plurality of target stations in accordance with the present invention.

FIG. 10 is a schematic block diagram of station 25 directly communicating with stations 25A, 27, 29, 31 and 33. In this scenario, station 25 formats the frames to provide the communication with the legacy devices.

Figure 11:
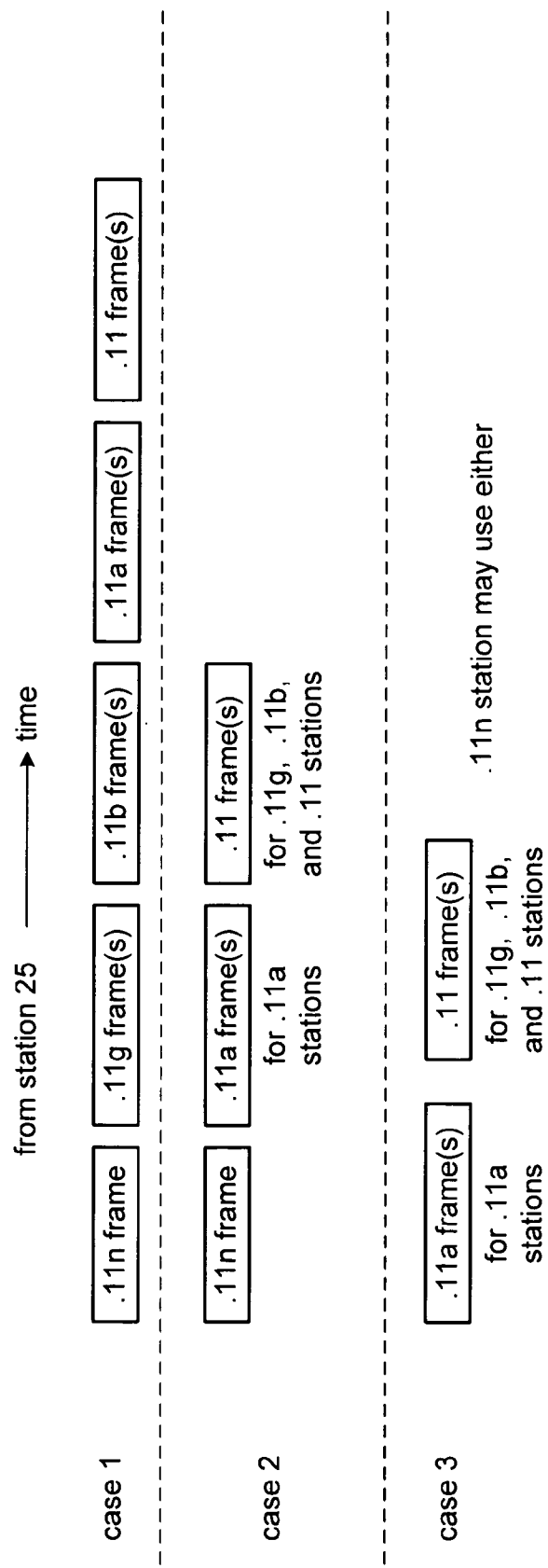
FIG. 11 is a diagram of numerous examples of the communication of FIG. 10 in which at least one frame from a source station is communicated to a plurality of target stations having differing protocols in accordance with the present invention.

FIG. 11 illustrates the various scenarios in which the station 25 may format the frames. As shown in case 1, the station 25 may sequentially transmit frames that are formatted in accordance with the particular protocol used by stations 25A, 27, 29, 31 and 33.

Case 2 provides an alternate scenario in which station 25 transmits the 802.11(n) frame to station 25A, produces 802.11(a) frame or frames in accordance with 802.11(a) standard for station 31 and produces 802.11 frames for the 802.11(g), 802.11(b) and 802.11 stations.

As a $3^{rd}$ scenario, station 25 may utilize both legacy frame formats of the 802.11(a) and 802.11 frames and transmit them sequentially. In this scenario, the 802.11(n) target station 25A may utilize either frame format.

Figure 12:
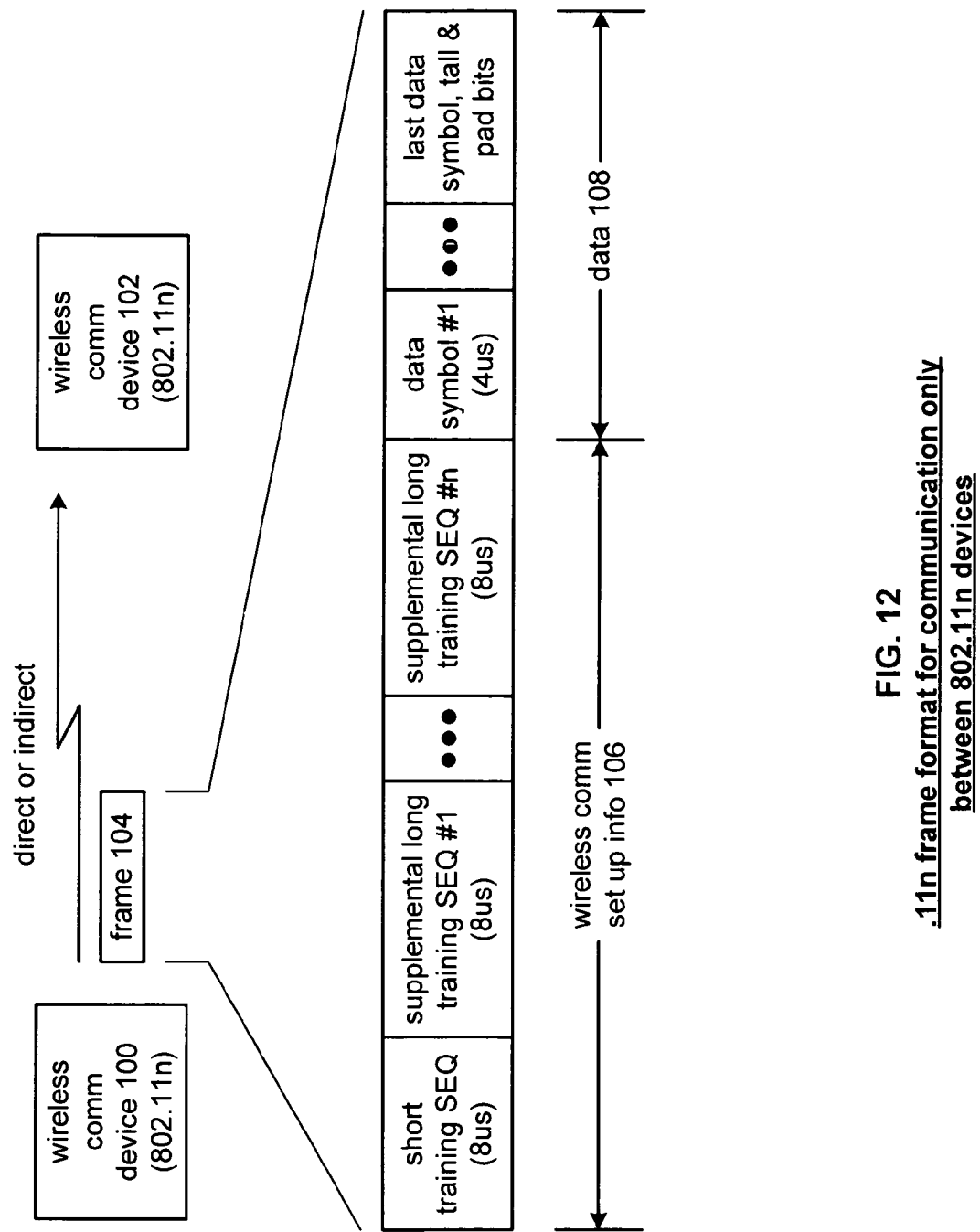
FIG. 12 is a diagram depicting a frame format in accordance with the present invention.

FIG. 12 is a diagram depicting a wireless communication between two wireless communication devices 100 and 102 that are in a proximal region where the only protocol that is used is IEEE 802.11n. The wireless communication may be direct (i.e., from wireless communication device to wireless communication device), or indirect (i.e., from a wireless communication device to an access point to a wireless communication device). In this example, wireless communication device 100 is providing frame 104 to wireless communication device 102. The frame 104 includes a wireless communication set-up information field 106 and a data portion 108. The wireless communication set-up information portion 106 includes a short training sequence that may be 8 microseconds long, a $1^{st}$ supplemental long training sequence that may be 8 microseconds long, which is one of a plurality of supplemental long training sequences. Note that the number of supplemental long training sequences will correspond to the number of transmit antennas being utilized for multiple input multiple output radio communications.

The data portion of the frame 104 includes a plurality of data symbols each being 4 microseconds in duration. The last data symbol also includes a tail bits and padding bits as needed.

Figure 13:
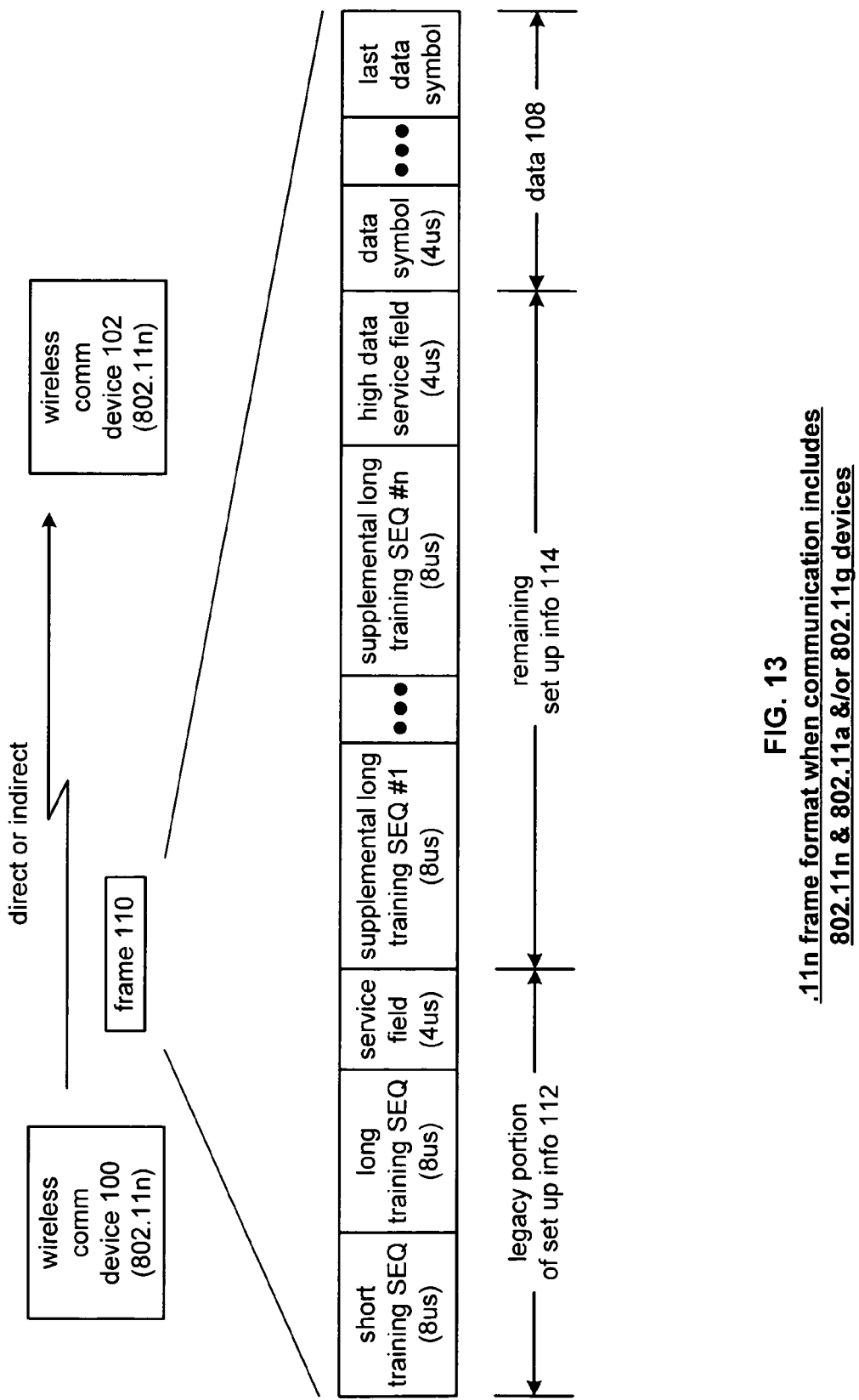
FIG. 13 is a diagram depicting another frame format in accordance with the present invention.

FIG. 13 is a diagram of a wireless communication between two wireless communication devices 100 and 102, each of which is compliant with IEEE 802.11n. Such a communication is taking place within a proximal area that includes 802.11n compliant devices, 802.11a compliant devices and/or 802.11g compliant devices. In this instance, the wireless communication may be direct or indirect where a frame 110 includes a legacy portion of the set-up information 112, remaining set-up information portion 114, and the data portion 108.

The legacy portion of the set-up information 112 includes a short training sequence, which is 8 microseconds in duration, a long training sequence, which is 8 microseconds in duration, and a service field, which is 4 microseconds in duration. The service field, as is known, includes several bits to indicate the duration of the frame 110. As such, the IEEE 802.11a compliant devices within the proximal area and the 802.11g compliant devices within the proximal area will recognize that a frame is being transmitted even though such devices will not be able to interpret the remaining portion of the frame. In this instance, the legacy devices (IEEE 802.11a and IEEE 802.11g) will avoid a collision with the IEEE 802.11n communication based on a proper interpretation of the legacy portion of the set-up information 112.

The remaining set-up information 114 includes additional supplemental long training sequences, which are each 8 microseconds in duration. The remaining set-up information further includes a high data service field, which is 4 microseconds in duration to provide additional information regarding the frame. The data portion 108 includes the data symbols, which are 4 microseconds in duration as previously described with reference to FIG. 3. In this instance, the legacy protection is provided at the physical layer.

Figure 14:
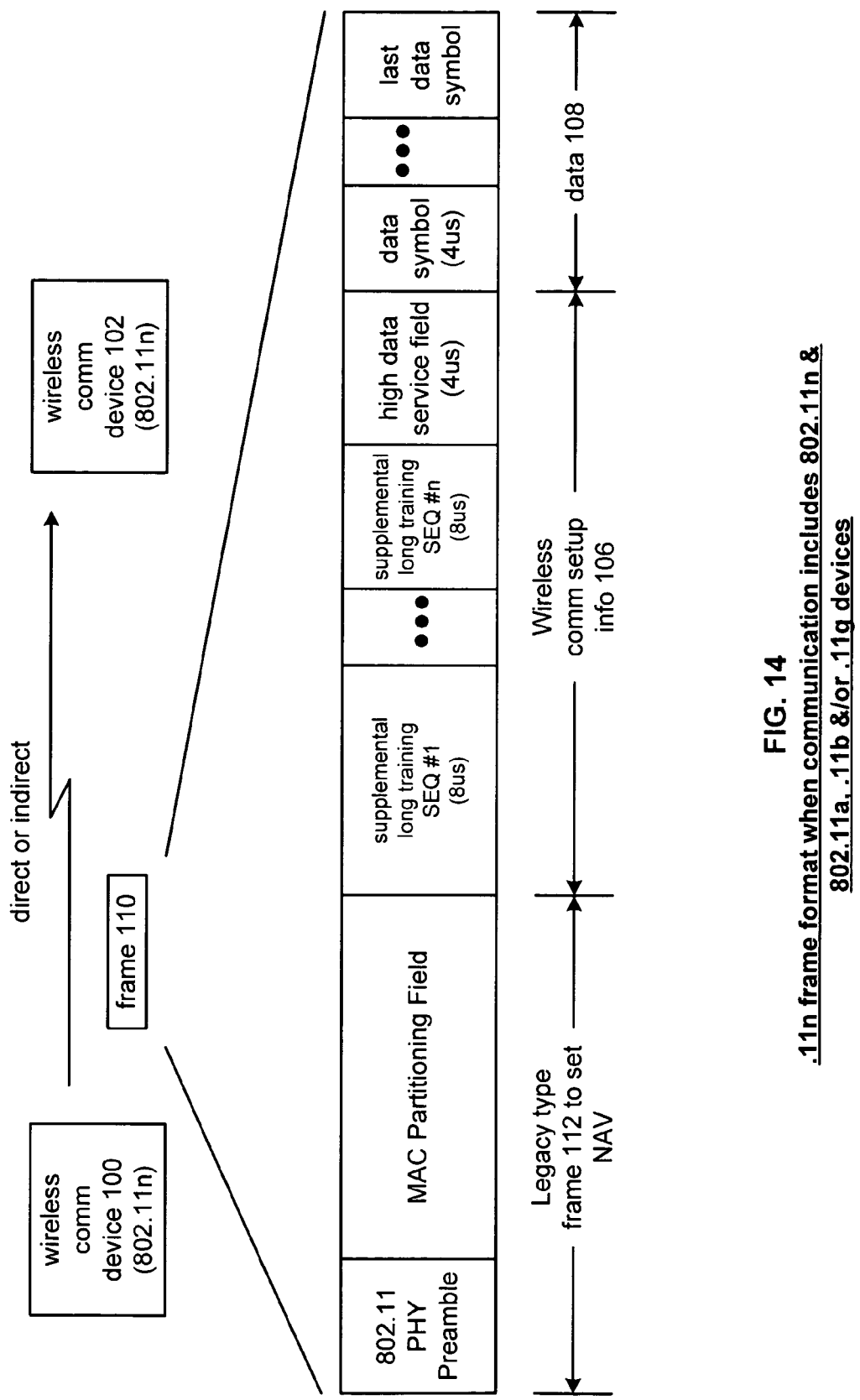
FIG. 14 is a diagram depicting yet another frame format in accordance with the present invention.

FIG. 14 is a diagram of a wireless communication between two wireless communication devices 100 and 102 that are both IEEE 802.11n compliant. The wireless communication may be direct or indirect within a proximal area that includes IEEE 802.11 compliant devices, IEEE 802.11a, 802.11b and/or 802.11g devices. In this instance, the frame includes a legacy portion of the set-up information 112, remaining set-up information 114 and the data portion 108. As shown, the legacy portion of the set-up information 112, or legacy frame, includes an IEEE 802.11 PHY preamble and a MAC partitioning frame portion, which indicates the particulars of this particular frame that may be interpreted by legacy devices. In this instance, the legacy protection is provided at the MAC layer.

The remaining set-up information 114 includes a plurality of supplemental long training sequences and the high data service field. The data portion 108 includes a plurality of data symbols as previously described.

Figure 15:
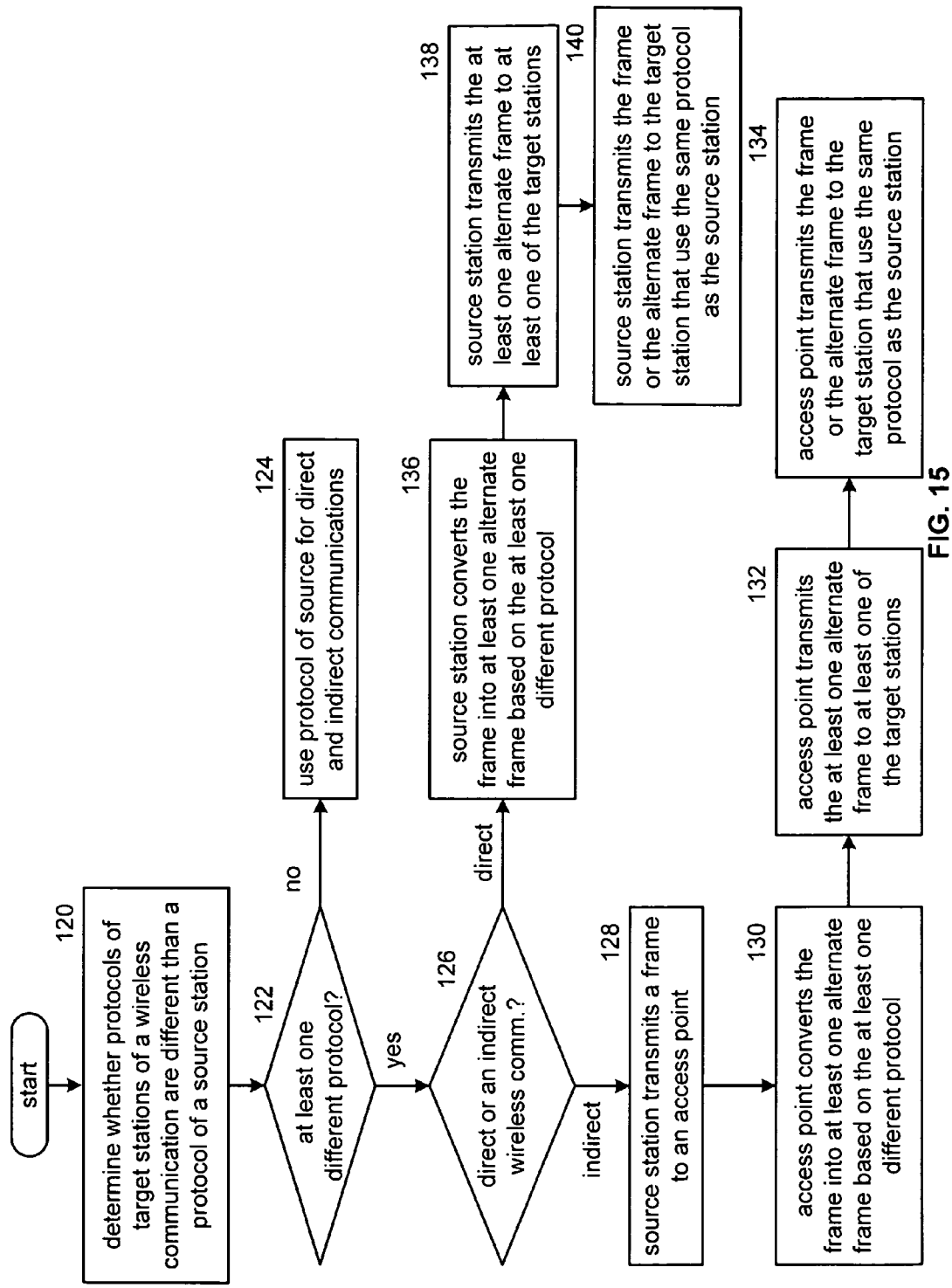
FIG. 15 is a logic diagram of a method for wireless communication between stations of differing protocols in accordance with the present invention.

FIG. 15 is a logic diagram of a method for wireless communication between stations of differing protocols. The method begins at step 120 where an access point or a source station determines whether protocols of target stations of a wireless communication are different than a protocol of a source station. In one embodiment, the source station is compliant with an IEEE 802.11n protocol, while the plurality of target stations may be compliant to one or more of IEEE 802.11, IEEE 802.11a, IEEE 802.11b, IEEE 802.11g, or IEEE 802.11n.

The method then branches at step 122 depending on whether at least one of the target stations has a different protocol than the protocol of the source station. When this true, the method branches to step 126 and when this is not true, the process branches to step 124. At step 124, the communication between the source station and the target stations uses the protocol of the source station. In one embodiment, the stations use an IEEE 802.11n protocol and frames may be exchanged directly or indirectly having a format as illustrated in FIG. 12.

At step 126 a determination is made as to whether the wireless communication is a direct wireless communication or an indirect wireless communication. When the wireless communication is an indirect communication (refer to FIGS. 3, 6, and 8), the method proceeds to step 128 and when the wireless communication is a direct communication (refer to FIG. 10), the method proceeds to step 136. At step 136, the source station converts the frame into at least one alternate frame based on the differing protocols of the target stations. Variation examples of the conversion are illustrated in FIG. 11.

The method the proceeds to step 138 where the source station transmits the alternate frame, or frames, to the target stations. Note that if more than one protocol is different than that of the source station, the source station may format legacy frames in accordance with existing standards to avoid collisions. For example, if the differing protocols include IEEE 802.11g and IEEE 802.11b, the frames for the target stations compliant with the IEEE 802.11g protocol will include a MAC layer backward compatibility frames a defined in the IEEE 802.11g protocol. The method then proceeds to step 140 where the source station transmits the alternate frame, or frames, to the target stations. Note that if one of the target stations uses the same protocol as the source station protocol, the source station may transmit a frame according to its protocol to such a target station.

For indirect wireless communications, the method proceeds to step 128 where the source station transmits a frame to the access point, wherein the frame is formatted in accordance with the protocol of the source station (e.g., IEEE 802.11n). The indirect communication may be any one of the communications illustrated in FIGS. 3, 6, and 8. The method proceeds to step 130 where the access point converts the frame into at least one alternate frame based on the protocol of the at least one of the target stations having the different protocol. This may be done in a variety of ways as illustrated in FIGS. 4, 5, 7, and 9. The method proceeds to step 132 where the access point transmits the at least one alternate frame to the at least one of the target stations. The method then proceeds to step 134 where access point transmits the frame or the alternate frame to target stations using the same protocol as the source station.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for wireless communication among stations having differing protocols. As one of average skill in the art will appreciate, other embodiments may be derived from the teachings of the present invention without deviating from the scope of the claims.

What is claimed is:

1. A method in a wireless local area network (WLAN) for wireless communication between a plurality of wireless stations of differing protocols in the WLAN, the method comprises:

determining whether protocols of wireless target stations of the plurality of wireless stations differ from a wireless protocol of a wireless source station of the plurality of wireless stations;

when at least one of the wireless target stations has a protocol differing from the protocol of the wireless source station, determining whether the WLAN includes an access point;

when the WLAN includes a wireless access point:
　receiving, by the access point, a frame formatted in accordance with the protocol of the wireless source station;
　reformatting, by the wireless access point, the frame into a reformatted frame having another frame format in accordance with the wireless protocol of the at least one wireless target station that differs from that of the wireless source station; and
　transmitting, by the wireless access point, the reformatted frame to the at least one of the wireless target stations.

2. The method of claim 1 further comprises:
transmitting, by the access point, the frame to other stations of the wireless target stations that use the protocol of the wireless source station.

3. The method of claim 1 further comprises:
transmitting, by the access point, the reformatted frame to other stations of the wireless target stations that use the protocol of the at least one of the wireless target stations that differs from that of the wireless source station.

4. The method of claim 1 further comprises:
determining that a first wireless target station supports a legacy protocol and does not support the protocol of the wireless source station, the legacy protocol older than the protocol of the wireless source station; and
reformatting, by the access point, the frame into the reformatted frame having the another frame format in accordance with the legacy protocol.

5. The method of claim 1 further comprises:
when each of a plurality of the wireless target stations has a different protocol than the protocol of the wireless source station, reformatting, by the access point, the frame into the reformatted frame having the another frame format in accordance with the different protocols of the plurality of wireless target stations.

6. The method of claim 1, wherein the reformatting the frame into the reformatted frame comprises:
determining frame length of the frame;
determining data rate of the frame;
determining data amount being conveyed in the frame; and
determining number of at least one alternate frame based on the data amount of the frame.

7. The method of claim 1, wherein the reformatting the frame into the reformatted frame comprises:
determining whether frequency band of the protocol of the at least one of the wireless target stations is different than a frequency band of the protocol of the wireless source station; and
when the frequency band of the protocol of the at least one of the wireless target stations is different than the frequency band of the protocol of the wireless source station, concurrently transmitting at least one alternate frame to the at least one of the wireless target stations and transmitting the frame to other stations of the wireless target stations that use the protocol of the wireless source station.

8. The method of claim 1, wherein the reformatting the frame into the reformatted frame comprises:
  determining whether frequency band of the protocol of the at least one of the wireless target stations is different than a frequency band of the protocol of the wireless source station;
  when the frequency band of the protocol of the at least one of the wireless target stations is not different than the frequency band of the protocol of the wireless source station, determining whether another channel in the frequency band of the protocol of the wireless source station is available; and
  when the another channel in the frequency band of the protocol of the wireless source station is available, concurrently transmitting the alternate frame via the another channel to the at least one of the wireless target stations and transmitting the frame to other stations of the wireless target stations that use the protocol of the wireless source station via a channel within the frequency band of the protocol of the wireless source station.

9. A wireless source station for use in a wireless local area network (WLAN) for wireless communications, the wireless source station comprises:
  a radio transmitter section operably coupled to convert outbound digital symbols into outbound radio frequency (RF) signals;
  a radio receiver section operably coupled to convert inbound RF signals received by the wireless source station into inbound digital symbols;
  baseband processing module operably coupled to convert the inbound digital symbols into a frame in accordance with a WLAN protocol and to:
    determine whether WLAN protocols of wireless target stations of the wireless communication are different than the WLAN protocol of the wireless source station;
    when at least one of the wireless target stations has a different WLAN protocol than the WLAN protocol of the wireless source station, the baseband processing module functions to:
      reformat the frame to a reformatted frame having another frame format in accordance with the WLAN protocol of the at least one of the wireless target stations having the different WLAN protocol to produce the reformatted frame; and
      transmit the reformatted frame via the radio transmitter section to the at least one of the wireless target stations that has a different WLAN protocol than the WLAN protocol of the wireless source station.

10. The wireless source station of claim 9, wherein the baseband processing module further functions to:
  provide the reformatted frame to the radio transmitter section for transmission to other stations of the wireless target stations that use the different WLAN protocol.

11. The wireless source station of claim 9 further comprises:
  transmitting, by the radio transmitter section, the frame to other stations of the wireless target stations that use the WLAN protocol of the wireless source station.

12. The wireless source station of claim 9, wherein the baseband processing module further functions to:
  determine that a first wireless target station supports a legacy WLAN protocol and does not support the WLAN protocol of the wireless source station, the legacy WLAN protocol older than the WLAN protocol of the wireless source station; and
  reformat the frame into the reformatted frame having the another frame format in accordance with the legacy WLAN protocol.

13. The wireless source station of claim 9, wherein the baseband processing module further functions to:
  when each of a plurality of the wireless target stations has a different WLAN protocol than the WLAN protocol of the wireless source station, reformat the frame into a plurality of reformatted frames in accordance with the different WLAN protocols of the plurality of wireless target stations.

14. The wireless source station of claim 9, wherein the reformatting the frame into the reformatted frame comprises:
  determining frame length of the frame;
  determining data rate of the frame;
  determining data amount being conveyed in the frame; and
  determining number of at least one alternate frame based on the data amount of the frame.

15. The wireless source station of claim 9, wherein the baseband processing module further functions to:
  when a wireless access point is present in the WLAN, providing the frame to the transmitter section for transmission to the wireless access point, wherein the frame is reformatted in accordance with the WLAN protocol.

16. A method in a wireless local area network (WLAN) for wireless communication between a plurality of wireless stations of differing protocols in the WLAN, the WLAN including an access point, the method comprises:
  determining whether protocols of wireless target stations of the plurality of wireless stations differ from a wireless protocol of a wireless source station of the plurality of wireless stations;
  when at least one of the wireless target stations has a protocol differing from the protocol of the wireless source station:
    receiving, by the access point, a frame formatted in accordance with the protocol of the wireless source station;
    reformatting, by the wireless access point, the frame into a reformatted frame having another frame format in accordance with the wireless protocol of the at least one wireless target station that differs from that of the wireless source station; and
    transmitting, by the wireless access point, the reformatted frame to the at least one of the wireless target stations.

17. The method of claim 16 further comprises:
  transmitting, by the access point, the frame to other stations of the wireless target stations that use the protocol of the wireless source station.

18. The method of claim 16 further comprises:
  transmitting, by the access point, the reformatted frame to other stations of the wireless target stations that use the protocol of the at least one of the wireless target stations that differs from that of the wireless source station.

19. The method of claim 16 further comprises:
  determining that a first wireless target station supports a legacy protocol and does not support the protocol of the wireless source station, the legacy protocol older than the protocol of the wireless source station; and reformatting, by the access point, the frame into the reformatted frame having the another frame format in accordance with the legacy protocol.

20. The method of claim 16 further comprises:

when each of a plurality of the wireless target stations has a different protocol than the protocol of the wireless source station, reformatting, by the access point, the frame into the reformatted frame having the another frame format in accordance with the different protocols of the plurality of wireless target stations.

\* \* \* \* \*